April 23, 1968    H. S. HOLLNAGEL ET AL    3,379,289
SELF-ADJUSTING BRAKING MECHANISM
Filed June 3, 1966    3 Sheets-Sheet 1

INVENTORS
Harold S. Hollnagel
Harold E. Hollnagel
By Dressler, Goldsmith, Clement, Gordon & Ladd
ATTORNEYS April 23, 1968 H. S. HOLLNAGEL ET AL 3,379,289
SELF-ADJUSTING BRAKING MECHANISM
Filed June 3, 1966 3 Sheets-Sheet 2

INVENTORS
Harold S. Hollnagel
Harold E. Hollnagel
By Dressler, Goldsmith, Clement
Gordon & Ladd
ATTORNEYS April 23, 1968 H. S. HOLLNAGEL ETAL 3,379,289
SELF-ADJUSTING BRAKING MECHANISM
Filed June 3, 1966 3 Sheets-Sheet 3
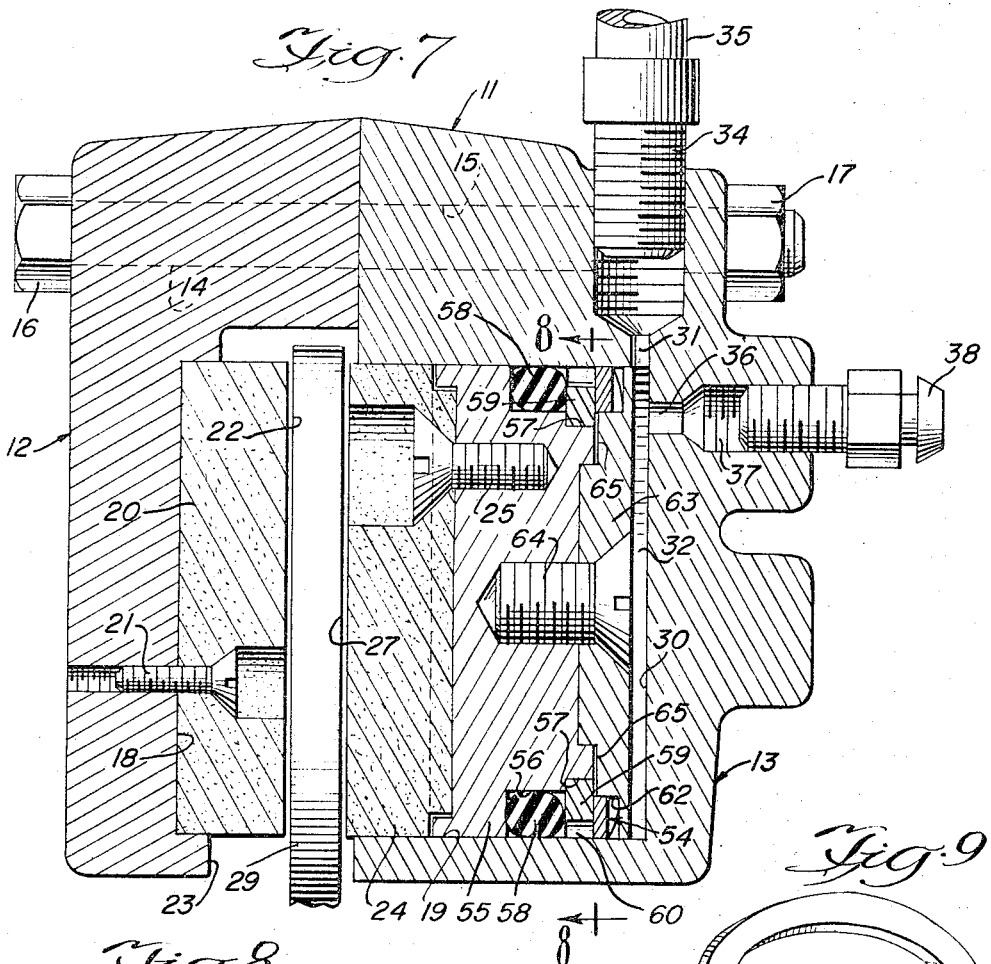
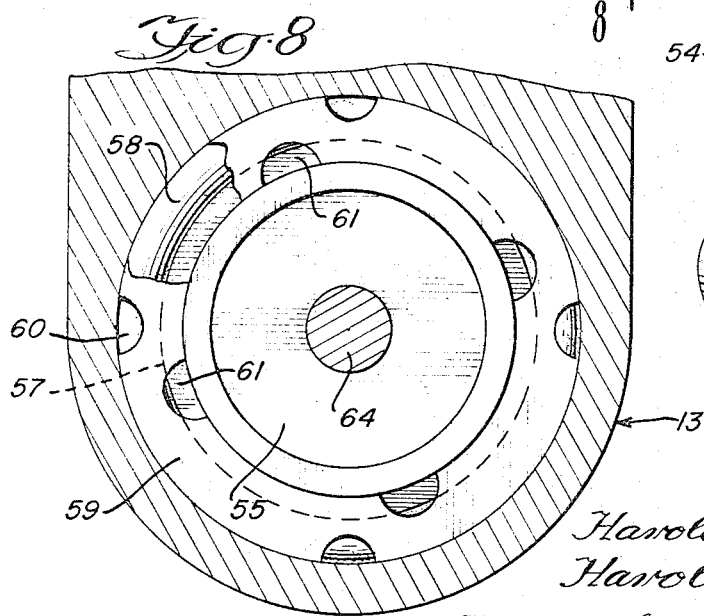
INVENTORS
Harold S. Hollnagel
Harold E. Hollnagel
BY Dressler, Goldsmith, Clement & Gordon
ATTORNEYS

# United States Patent Office 3,379,289
Patented Apr. 23, 1968

3,379,289
SELF-ADJUSTING BRAKING MECHANISM
Harold S. Hollnagel, 918 W. Laramie Lane, and Harold E. Hollnagel, 10229 N. River Road, both of Milwaukee, Wis. 53217
Continuation-in-part of application Ser. No. 464,296, June 16, 1965. This application June 3, 1966, Ser. No. 562,033
6 Claims. (Cl. 188—196)

ABSTRACT OF THE DISCLOSURE

Embodiments of friction brake mechanisms are disclosed wherein a housing defines a guide cylinder for a hydraulically actuated piston of a self-retracting type. A continuous one-piece friction ring encircles the reduced rear end of the piston which receives a rigid back up element to be engaged during advance of the piston in moving to its brake apply position for causing the friction ring to assume a stable advanced position determined by the brake system wear. A compression spring normally reacts between the friction ring and the back up element to urge the piston towards a brake release position in which there is a predetermined axial clearance relation between the back up element and the friction ring. Positive stop engagement determines this axial clearance relation. In one form, an annular intermediate recess opens through the rear of the piston and receives a coil type compression spring. In another form, a reduced diameter edge recess on the piston receives an annular wave spring overlapping an outer marginal portion of the friction ring with the back up element overlapping an inner marginal portion of the friction ring to establish the positive stop relationship for defining the predetermined axial clearance, with the friction ring having pairs of axial slots each comprising an inner peripheral slot and an outer peripheral slot adjacent but offset circumferentially therefrom.

---

This application is a continuation-in-part of our prior copending application Ser. No. 464,296, filed June 16, 1965 now abandoned.

This invention relates to a self-adjusting braking mechanism actuated by hydraulic power, and is particularly concerned with means for automatically taking up slack in the braking mechanism caused by wear on the braking surfaces to compensate for such wear and thus insure efficient braking action throughout the life of the braking elements and to pull the piston and pad off the face of the disk to a predetermined amount.

The braking mechanism is designed for use with apparatus of comparatively low horse power, such as, for example, golf carts, lawn mowers, etc., but it will be understood that use is not limited to such apparatus.

In accordance with the present invention, a disk, rigidly secured to a rotating member that is to be braked, is mounted between a pair of oppositely disposed braking elements. One of the braking elements is relatively fixed, and the other is moved, by hydraulic pressure, to force the disk into engagement with the relatively fixed brake element so that both brake elements cooperate to exert braking pressure against opposite surfaces of the disk. The braking mechanism includes means compensating for the wear on the brake elements during each application of the brake and also to pull the pad off the face of the disk after each application. The wear on the brake elements makes it necessary for the movable brake element to move a slight additional distance forwardly of the terminal of its forward movement on the preceding operation in order to perform its braking function properly. A washer that limits the rearward movement of the movable brake element upon each release of the braking pressure is moved forwardly a distance equal to the additional forward movement of the movable brake element, thus maintaining a uniform rearward movement of the movable brake element at all times, giving a predetermined amount of movement back so there is clearance between the disk and pad.

A structure by means of which the above noted and other advantages of the invention are attained will be fully described in the following specification, taken in conjunction with the accompanying drawings, showing three preferred illustrative embodiments of the invention, in which:

FIGURE 7 is a cross-section view, similar to FIGURE 1, but showing a new piston assembly with a wave spring and a notched press ring;

FIGURE 8 is a cross-sectional view, taken along the line 8—8 of FIGURE 7; and

FIGURE 9 is a detail perspective view of the wave spring.

Figure 1:
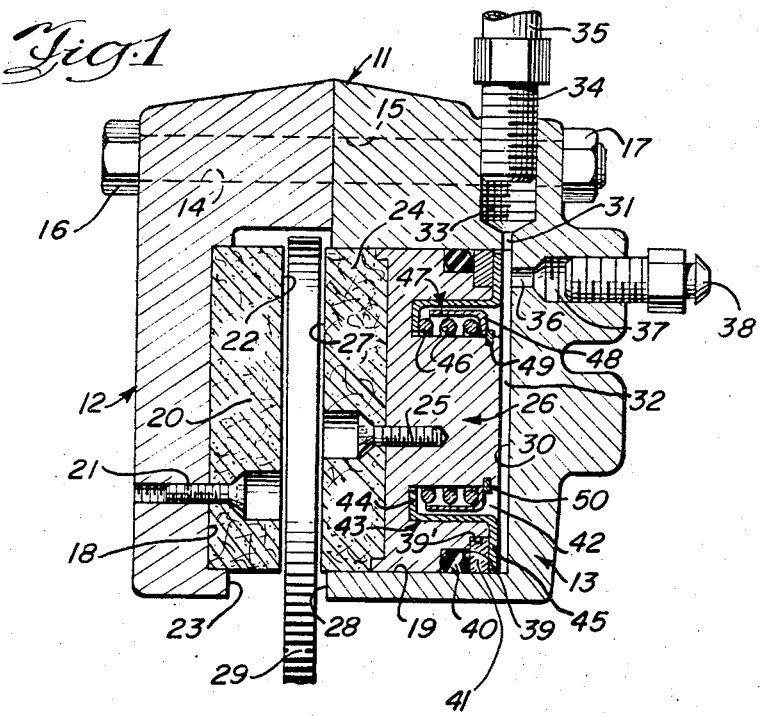
FIGURE 1 is a cross-sectional view of a braking mechanism embodying the invention.
Figure 2:
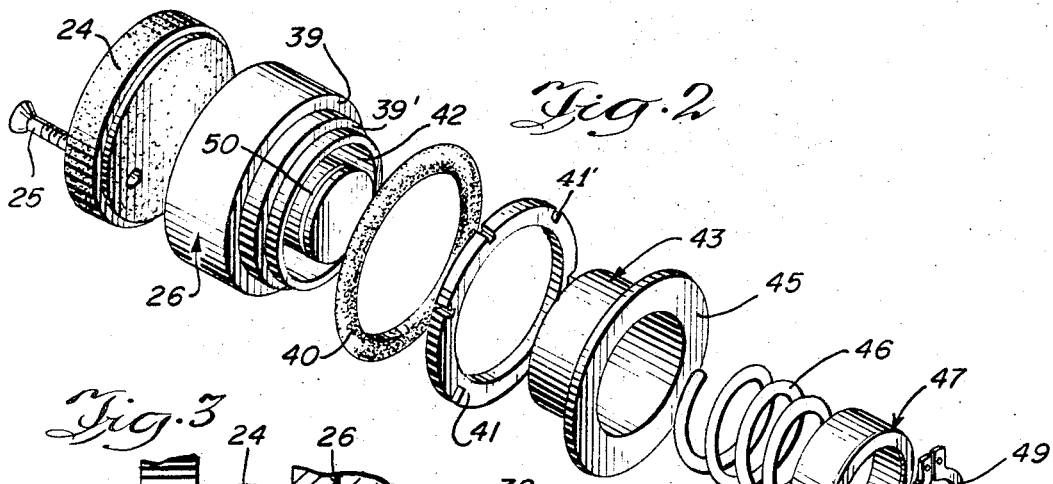
FIGURE 2 is an exploded perspective view showing the parts of the movable brake element.
Figure 3:
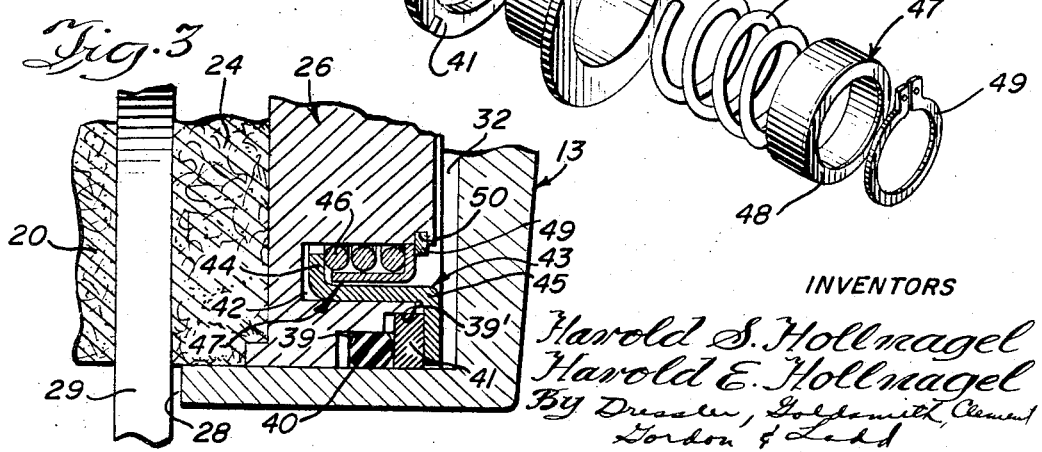
FIGURE 3 is an enlarged fragmentary cross-sectional view of the movable brake element of FIGURE 1.

Referring to FIGURES 1 to 3 of the drawings, the braking mechanism includes a housing 11 comprising two complementary castings 12 and 13, preferably of aluminum. The casting 12 is provided with a plurality of transverse bores 14, and casting 13 is provided with a plurality of similar bores 15 adapted to be aligned with the bores 14 when the housing is assembled. The castings are secured together in assembled relationship by bolts 16, extending through aligned bores 14 and 15, and nuts 17 threaded on the ends of the bolts.

The inner face of casting 12 is provided with a comparatively shallow recess 18, and the inner face of casting 13 is provided with a recess 19 of considerably greater depth. The recesses 18 and 19 may be of any desired shape, but are preferably of circular cross section. A friction block or brake element 20, shaped to conform to the shape of the recess 18, is fitted within it, and is rigidly secured to the casting 12 by a countersunk screw 21. The braking surface 22 of the friction block 20 extends inwardly beyond the inner face 23 of casting 12 contiguous to the recess 18.

A friction block or brake element 24, fitting in the recess 19, is secured, by means of a countersunk screw 25, to a piston 26 also seated in the recess 19. The screws 21 and 25 are each arranged eccentrically to prevent rotation movement of the friction blocks 20 and 24, respectively. The braking surface 27 of the friction block 24 extends inwardly beyond the inner face 28 of casting 13 contiguous to the recess 19. When the braking mechanism is in its released position, the braking surfaces are spaced slightly from opposite surfaces of a rotating disk 29 which the braking mechanism is designed to stop.

In the released position of the braking mechanism, as shown in FIGURE 1, the piston 26 is spaced forwardly of the rear wall 30 of recess 19. A small diameter bore 31 extending through the top of casting 13 communicates with the space 32 between the piston 26 and the rear wall 30. The upper portion of bore 31 is counterbored and threaded, as indicated at 33, to receive a fitting 34 connected to a high pressure hydraulic line 35. The casting 13 is also provided with one or more air bleeder bores 36, counterbored and threaded, as indicated at 37, to receive suitable bleeder valves 38. When the space 32 is filled with liquid, the brake is pumped to expel the air through the bleeder valve 38. The bleeder valves are closed as soon as the air is completely expelled.

The peripheral edge of the piston 26 is recessed adjacent the rear surface of the piston, as indicated at 39 and 39'. An O-ring 40 is positioned in the recess 39 to seal the joint between the cylindrical walls of the piston and the recess 19 to prevent leakage of any liquid forwardly of the piston. A washer 41 is fitted snugly into the recess 19 and is so located that when the piston 26 is positioned in the recess 19, the washer fits into the recess 39' and abuts the rear edge of the O-ring 40. The snug fit of the washer 41 against the inner surface of the recess 19 holds it against movement at the start of the piston's movement, but does not prevent its later movement as hereinafter described.

The rear surface of the piston 26 is provided with a relatively deep annular recess 42 for receiving a mechanism, hereinafter described, adapted to cooperate with the washer 41 to limit the travel of the brake element on successive brake applications, to compensate for the wear on the friction blocks 20 and 24, and to retract the piston. The location of the recess 42 in the rear surface of the piston enhances the efficiency of the braking mechanism because the space for the adjusting means is taken out of the rear side of the piston 26, and does not either reduce the area of the braking surface, or increase the overall size of the housing in which the braking mechanism is mounted.

An angularly shaped annular washer 43 has an annular flange 44 seated in the bottom of the recess 42 and an oppositely disposed annular flange 45 positioned against the rear surface of the washer 41. A helical compression spring 46 is seated in the recess 42 with one end thereof bearing against the flange 44 in the bottom of the recess. A cup-shaped retainer 47 encircling the spring 46 has its rearmost end 48 bent over the rearmost coil of spring 46. The opposite end of the retainer 47 is spaced a predetermined distance from the flange 44. A snap ring 49 is held in the recess 42 rearwardly of the end 48 of the cup-shaped retainer 47 by engagement with a groove 50 extending into the wall of the recess 42. The snap ring 49 holds the spring 46 and retainer 47 against accidental displacement from the recess 42.

When the brake is applied, a valve (not shown) in the high pressure hydraulic line 35 is opened, by any suitable means, to cause the liquid to flow from the line 35 into the space 32 rearwardly of the piston 26. The pressure of the liquid flowing into the space 32 moves the piston 26 forwardly toward the disk 29. It should be noted that the washers 41 and 43 remain stationary as the piston 26 starts moving toward the disk 19.

In the released position of the brake, the spring 46 is not compressed. As the piston 26 is moved forwardly, the snap ring 49 moves the cup-shaped retainer 47 forwardly, and thus compresses the spring. The cup-shaped retainer 47 holds the coils of the spring against lateral displacement during the compression of the spring to keep it from collapsing. The distance between the forward end of the retainer 47 and the flange 44 is equal to the distance the friction block 24 is moved away from the disk 29 when the brake is released. Therefore, when the forward end of the retainer moves into engagement with the flange 44, the friction block 24 moves into engagement with the disk 29. The disk 29 has a slight amount of play, and the pressure of the friction block 24 against one surface of the disk forces the opposite surface of the disk into engagement with the friction block 20 to increase the total effective braking surface of the mechanism. The brake clearance is so small that the O-ring 40 is not displaced from the recess 39. During this slight forward movement of the piston 26, the interengagement of the retainer 47 and the flange 44 causes the washers 43 and 41 to be moved forwardly the same distance as the piston 26.

When the brake is released, the spring 46 exerts force against the snap ring 49 to move the piston 26 rearwardly to approximately its initial position. The liquid rearwardly of the piston 26 is forced outwardly through the slots in the washer 41 back to the master cylinder through the brake line as the spring 46 moves the piston rearwardly. The washer 41 acts as a stop member engaged by the piston 26 to limit the rearward movement of the piston. To compensate for the wear on the friction blocks, the washer 41 is moved forwardly by the additional forward movement of the piston, and the rearward movement of the piston is uniform each time the brake is released.

Figure 4:
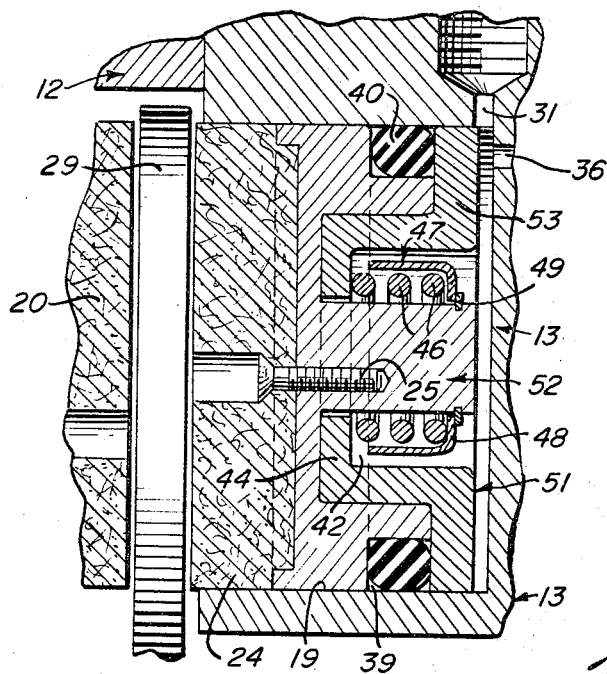
FIGURE 4 is a fragmentary cross-sectional view of a modified embodiment of the invention.
Figure 5:
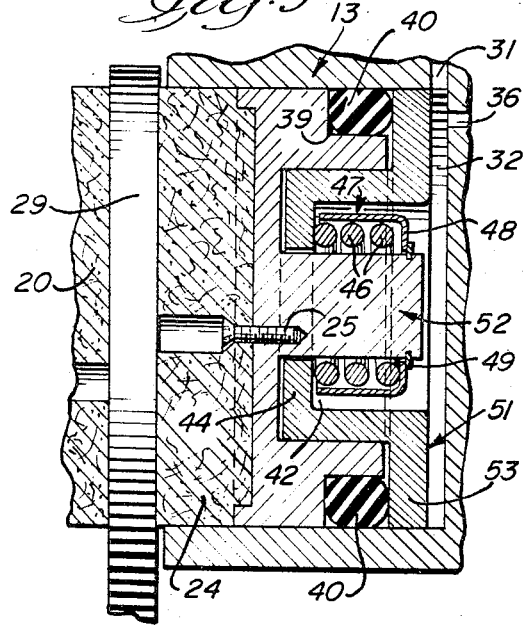
FIGURE 5 is a cross-sectional view of the structure of FIGURE 4 with the braking mechanism in braking position.
Figure 6:
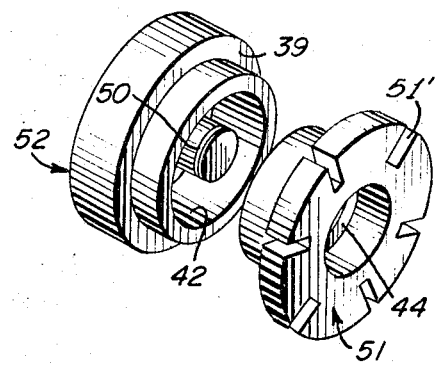
FIGURE 6 is a detailed perspective view of the piston and the press fitted washer of FIGURE 4.

The structure of the braking mechanism has been simplified even more in the embodiment of the invention disclosed in FIGURES 4, 5 and 6 of the drawings. Since much of the structure of this embodiment is identical to the structure described above, the identical structure will be designated by the same reference numbers and the description thereof will not be repeated.

In this embodiment, the washers 41 and 43 are replaced by a washer 51 that perform the functions of both washers 41 and 43 in the earlier described embodiment. The portion of the rear surface of the piston 52 outwardly of the recess 42 is flush with the rear edge of the recess 39, and the rear flange 53 of the washer 51 is positioned adjacent the O-ring 40. The outer end of the flange 53 is thicker than the flange 45 to provide a good bearing surface for the movement of the washer 51 relative to the casting 13. The washer 51 is moved forwardly by its interengagement with the front end of the retainer 47 in the same manner as the washer 43 is moved, and the flange 53 limits the rearward movement of the piston 52 in the same manner as the rearward movement of the piston 26 is limited by the washer 41.

The embodiment of the invention disclosed in FIGURES 7, 8, and 9 is essentially the same as the embodiment of FIGURES 4, 5, and 6, except that a wave spring 54 has been substituted for the spring 46. The structure of this embodiment that is identical to the structure described above will be designated by the same reference numerals, and the description thereof will not be repeated.

In the embodiment of FIGURES 7 to 9, the friction block or brake element 24 is secured to a piston 55 by one or more countersunk screws 25. The peripheral edge of the piston 55 is recessed adjacent the rear surface of the piston, as indicated at 56 and 57. An O-ring 58 is positioned in the recess 56 to seal the joint between the cylindrical walls of the piston 55 and the recess 19 to prevent leakage of liquid within the casting 13 forwardly of the piston. An annular washer 59 is press fitted into the recess 19 and fits in the recess 57 with only the inner peripheral edge portion of its front face engaging a portion of the piston defining one face of the recess 57.

As shown in FIGURE 8, the washer 59 is provided with a series of notches 60 in its outer edge portion and a series of notches 61 in its inner edge portion. The notches of each series are spaced uniformly about the circumference of the washer, and each notch 60 is positioned close to one of the notches 61. Although it is preferred to have four notches in each series, the number may be varied, if desired. The purpose of the notches will be hereinafter disclosed in connection with the description of the operation of the braking mechanism.

The wave spring 54 fits within a recess 62 in a backing plate 63 that is secured to the rear surface of the piston 55 by a screw 64. The backing plate is spaced forwardly of the space 32, and its inner face is in surface-to-surface contact with the outer face of the piston 55, so that fluid from the high pressure line 35 moves the backing plate and the piston as a unit toward brake applying position.

The initial forward movement of the backing plate 63 compresses wave spring 54, but does not move the washer 59 because of a clearance gap, indicated at 65, between the backing plate and the rear surface of the washer 59.

The clearance gap 65 is great enough to allow the friction block or brake element 24 to be moved into braking engagement with the disk 29 if there is no wear. As the brake element is moved forwardly a distance equal to the clearance gap 65, the wave spring 54 will be compressed. After the clearance gap is closed and the spring 54 is compressed, the brake element must be moved forwardly an additional distance, equivalent to the reduction in the thickness of the brake element due to wear, in order to establish a braking engagement between the face of the brake element 24 and the surface of the disk 29.

During this additional forward movement of the brake element, the wave spring exerts some pressure against the outer peripheral edge portion of the washer 59, and the backing plate 63 exerts pressure against the inner peripheral edge portion of the washer 59, to move the washer 59 forwardly a distance equal to the wear on the face of the brake element. The spaced relationship of the notches 60 and 61 permits the washer 59 to be compressed like a spring as it is moved forwardly with the backing plate and the wave spring.

Upon the release of the fluid pressure after a brake application, the wave spring exerts force against the backing plate 63 to move the brake element rearwardly a distance equal to the clearance gap 65. The spring-like compression of the washer 59 causes it to cooperate with the wave spring 54 to initiate the rearward movement of the backing plate and the brake element, but the washer 59 remains fixed because of its press fit within the casting 13 as the backing plate and piston are moved rearwardly to re-establish the clearance gap 65.

In each embodiment of the invention, the braking mechanism is provided with a clearance gap that measures the distance the brake element must move toward brake applying position before the washer is moved. The additional movement of the brake element and the washer toward brake applying position compensates for the wear on the braking surface. When the braking pressure is released, the brake element is moved rearwardly only far enough to re-establish the clearance gap. In this way the extra movement of the brake element in the brake applying direction compensates for the wear on the brake element until it requires replacement.

It is understood that this retractor and self-adjuster can also be used in any conventional, internal expending brake cylinder, since it is not dependent on any portion of the actuating cylinder but the internal bore of said cylinder. This can also be used in two piston assemblies mounted back to back, or singly in a conventional, hydraulic brake cylinder bore to actuate and self-adjust shoes without the use of presently used complicated mechanisms.

Although several embodiments of the invention have been described in considerable detail, it will be understood that the description thereof is intended to be illustrative, rather than restrictive, as many details of structure may be modified or changed without departing from the spirit or scope of the invention. Accordingly, it is not desired to be restricted to the exact structure described.

What is claimed is:

1. In a friction brake mechanism that includes a housing provided with an internal surrounding guide wall and defining a pressure cylinder having a closed end and an open end, means for supplying hydraulic liquid at positive pressure to said closed end of said cylinder, a friction block disposed at said open end of said cylinder, a piston in said cylinder having a front end engageable with said friction block and having a free rear end of reduced transverse dimension to define a continuous peripheral clearance space between said guide wall and said piston, said piston being slidable along said cylinder between a forward brake apply position and a rearward brake release position, a seal ring in said space encircling said piston and sealingly engaging said piston and said guide wall, a back up element removably mounted to the rear end of said piston to undergo unitary axial shifting movement with said piston, a continuous friction ring of greater diameter than the rear end of said piston and disposed in friction gripping engagement with said guide wall immediately behind said seal ring, and compression spring means reacting between said back up element and said friction ring normally to urge said piston towards brake release position, said back up element presenting an abutment surface of greater diameter than the rear end of said piston and serving as a positive stop having a predetermined axial clearance relation to said friction ring when the piston is in said brake release position, said abutment surface being engageable directly with said friction ring to act in thrust transmitting relation thereto upon forward movement of said piston to brake apply position whereby said piston effects advance of the friction ring in accordance with wear at the friction block and effects compression of said spring means whereby said spring means effects automatic retraction of said piston to a brake release position which defines said predetermined axial clearance relation.

2. In a friction brake mechanism that includes a housing provided with an internal surrounding guide wall and defining a pressure cylinder having a closed end and an open end, means for supplying hydraulic liquid at positive pressure to said closed end of said cylinder, a friction block disposed at said open end of said cylinder, a piston in said cylinder having a front end engageable with said friction block and having a free rear end of reduced transverse dimension to define a continuous peripheral clearance space between said guide wall and said piston, said piston being slidable along said cylinder between a forward brake apply position and a rearward brake release position, a seal ring in said space encircling said piston and sealingly engaging said piston and said guide wall, a back up element mounted to the rear end of said piston to undergo unitary axial shifting movement with said piston, a continuous friction ring disposed in friction gripping engagement with said guide wall immediately behind said seal ring, and compression spring means reacting between said back up element and said friction ring normally to urge said piston towards brake release position, said back up element presenting an abutment surface serving as a positive stop having a predetermined axial clearance relation to said friction ring when the piston is in said brake release position, said abutment surface being engageable in thrust transmitting relation to said friction ring upon forward movement of said piston to brake apply position whereby said piston effects advance of the friction ring in accordance with wear at the friction block and effects compression of said spring means whereby said spring means effects automatic retraction of said piston to a brake release position which defines said predetermined axial clearance relation, and wherein said friction ring seats in said annular clearance space, said piston has an annular intermediate diameter recess opening axially rearwardly, said back up element occupies a rear extremity of said recess and includes an axially forwardly projecting sleeve portion presenting a forward edge defining said abutment surface, an annular washer of multi-angular section has a radial inward forward flange portion occupying a front extremity of said recess and a radial outward rearward flange portion extending in rearwardly overlapping relation to said piston and to said friction ring, said compression spring means being disposed in said recess to react axially between said back up element and said forward flange portion to urge said piston axially rearwardly until said rearward flange portion engages said piston to establish said predetermined axial clearance between said abutment surface and said forward flange portion when said piston is in brake release position.

3. In a friction brake mechanism that includes a housing provided with an internal surrounding guide wall and defining a pressure cylinder having a closed end and an open end, means for supplying hydraulic liquid at positive pressure to said closed end of said cylinder, a friction block disposed at said open end of said cylinder, a piston in said cylinder having a front end engageable with said friction block and having a free rear end of reduced transverse dimension to define a continuous peripheral clearance space between said guide wall and said piston, said piston being slidable along said cylinder between a forward brake apply position and a rearward brake release position, a seal ring in said space encircling said piston and sealingly engaging said piston and said guide wall, a back up element mounted to the rear end of said piston to undergo unitary axial shifting movement with said piston, a continuous friction ring disposed in friction gripping engagement with said guide wall immediately behind said seal ring, and compression spring means reacting between said back up element and said friction ring normally to urge said piston towards brake release position, said back up element presenting an abutment surface serving as a positive stop having a predetermined axial clearance relation to said friction ring when the piston is in said brake release position, said abutment surface being engageable in thrust transmitting relation to said friction ring upon forward movement of said piston to brake apply position whereby said piston effects advance of the friction ring in accordance with wear at the friction block and effects compression of said spring means whereby said spring means effects automatic retraction of said piston to a brake release position which defines said predetermined axial clearance relation, and wherein said piston has an annular intermediate diameter recess opening axially rearwardly, said back up element occupies a rear extremity of said recess and includes an axially forwardly projecting sleeve portion presenting a forward edge defining said abutment surface, said friction ring being of multiangular section having a radial inward forward flange portion occupying a front extremity of said recess and a radial outward rearward flange in rearwardly overlapping relation to said piston and to said seal ring, said compression spring means being disposed in said recess to react between said back up element and said forward flange portion to urge said piston rearwardly until said rearward flange portion engages said piston to establish said predetermined axial clearance between said abutment surface and said forward flange portion when said piston is in brake release position.

4. In a friction brake mechanism in accordance with claim 1 wherein said friction ring seats in said annular clearance space, said back up element has a notched marginal portion defining said abutment surface in overlapping normally spaced relation to a marginal portion of said friction ring and defining an annular recess in overlapping relation to an adjacent portion of said friction ring, said compression spring means being disposed in said recess to react axially between said back up element and said forward flange portion to urge said piston axially rearwardly until said abutment surface on said back up element is spaced said predetermined axial clearance from said friction ring.

5. In a friction brake mechanism in accordance with claim 4 wherein said back up plate has said recess located immediately radially outwardly of said abutment surface, said compression spring means is an annular wave spring, and said friction ring has a plurality of pairs of slots opening axially therethrough at circumferentially spaced regions thereabout, each pair of slots including an outer peripheral slot and an inner peripheral slot adjacent but circumferentially offset therefrom.

6. In a friction brake mechanism in accordance with claim 1 wherein said friction ring has a plurality of pairs of slots opening axially therethrough at circumferentially spaced regions thereabout, each pair of slots including an outer peripheral slot and an inner peripheral slot adjacent but circumferentially offset therefrom.

References Cited
UNITED STATES PATENTS

| | | | |
|---|---|---|---|
| 2,358,740 | 9/1944 | Scott-Iversen | 188—79.5 |
| 3,155,200 | 11/1964 | Halibrand | 188—196 |
| 3,255,846 | 6/1966 | Livezey | 188—196 X |

FOREIGN PATENTS

| | | |
|---|---|---|
| 711,405 | 6/1954 | Great Britain. |

DUANE A. REGER, *Primary Examiner.*